United States Patent [19]

Martinen et al.

[11] Patent Number: 4,634,831

[45] Date of Patent: Jan. 6, 1987

[54] LASER-MACHINING APPARATUS

[75] Inventors: Hinrich Martinen, Quickborn; Samuel S. Simonsson, Winsen/Bahlburg; Peter Wirth, Winsen/Ludorf, all of Fed. Rep. of Germany

[73] Assignee: Rofin-Sinar Laser, Hamburg, Fed. Rep. of Germany

[21] Appl. No.: 575,227

[22] Filed: Jan. 30, 1984

[30] Foreign Application Priority Data

Feb. 15, 1983 [DE] Fed. Rep. of Germany ... 8304141[U]

[51] Int. Cl.⁴ .............................................. B23K 26/00
[52] U.S. Cl. ..................... 219/121 LG; 219/121 LP; 219/121 LQ; 372/93; 372/106
[58] Field of Search ...................... 372/94, 106, 93, 98; 219/121 LQ, 121 LG, 121 LP, 121 LN, 121 LH, 121 LJ, 121 L, 121 LM

[56] References Cited

U.S. PATENT DOCUMENTS

| | | | |
|---|---|---|---|
| 4,219,786 | 8/1980 | Chester | 372/93 |
| 4,340,969 | 7/1982 | Hamilton | 372/93 |
| 4,380,694 | 4/1983 | Dyson | 219/121 LQ |
| 4,420,836 | 12/1983 | Harper | 372/93 |
| 4,547,651 | 10/1985 | Maruyama | 372/106 |

FOREIGN PATENT DOCUMENTS 2528467 12/1976 Fed. Rep. of Germany ........ 372/93

Primary Examiner—James W. Davie
Attorney, Agent, or Firm—Prutzman, Kalb, Chilton & Alix

[57] ABSTRACT

A laser apparatus is disclosed comprising a resonator for emitting a laser beam, an assembly for circularly or elliptically polarizing the laser beam emitted from the resonator, a lens assembly for focusing the laser beam from the polarizer to a workpiece with the laser beam from the polarizer to the lens having an axis, and the resonator having a folding mirror assembly for linearly polarizing the laser beam with the resonator being positioned relative to the polarizer so that the plane of reflection of the mirror assembly is approximately 45 degrees relative to the axis.

4 Claims, 3 Drawing Figures

Fig.1
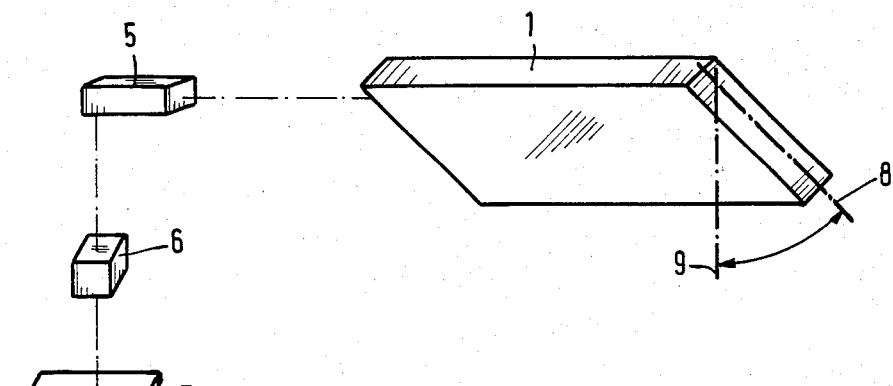
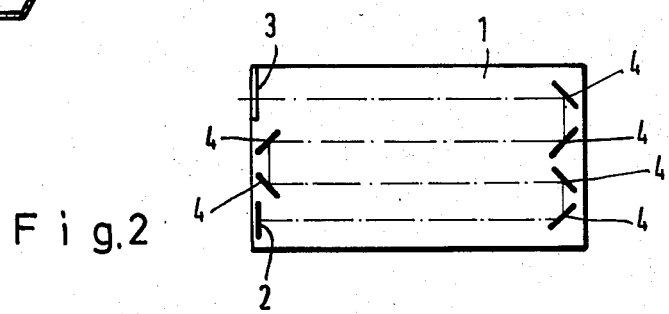
Fig.2
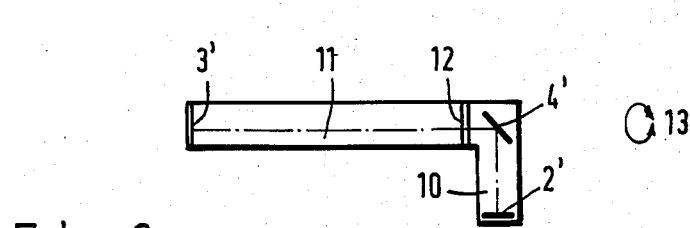
Fig.3

LASER-MACHINING APPARATUS

BACKGROUND AND SUMMARY OF THE INVENTION

The invention relates to a laser-machining apparatus, possessing a device for effecting the circular polarization or elliptical polarization of the laser beam, this device comprising a mirror assembly for effecting the linear polarization of the laser beam at an angle of, for instance, 45° to the vertical.

In known laser equipment of this type, the device for effecting the circular or elliptical polarization of the laser beam comprises, on the one side, a mirror arrangement for effecting the linear polarization of the laser beam which emerges from the resonator and, on the other side, comprises an optical arrangement for shifting the phase position of a partial beam by ¼ of a wavelength in relation to the other partial beam. In order to enable a circular or elliptical polarization to result, in the latter arrangement, by superposition, the plane of polarization of the laser beam entering this arrangement must be inclined at 45° to the vertical. When the laser beam is unpolarized, the arrangement, in such an angular position, of the mirror assembly provided for effecting the linear polarization presents no problems. However, a mirror assembly of this nature is expensive, and the more so when account is taken of the ongoing maintenance and replacement costs. These expenses are not eliminated even when use is made of a resonator from which the laser beam emerges in a polarized state, because the plane of polarization must then be rotated in a manner such that it is located in the desired angular position with respect to the vertical.

The object underlying the invention is to reduce this expenditure.

The object of the invention is achieved when the mirror assembly for effecting the linear polarization of the laser beam is formed by folding mirrors which are installed inside the resonator, and the latter is arranged in a manner such that a plane of reflection of the folding mirrors lies at 45° to the vertical.

On account of its size, and on account of the design-related relationships with the auxiliary components, the resonator is the main component which clearly conditions the construction of the apparatus. In the technology relating to the design of a laser apparatus, the starting assumption has hitherto been made to the effect that the position of the resonator is chosen in order to satisfy design-related aspects alone, since the comparatively lightweight, small and adaptable optical components can thereafter be adapted, without problems, to suit the position of the resonator. For this reason, when folded resonators were used, the positioning of the plane of reflection of the folding mirrors, in one of the principal design directions, namely in the vertical plane, or in the horizontal plane, apparently formed part of the above-mentioned starting assumption, as a precondition which could not be overturned. Accordingly, the invention is based on the underlying concept according to which the small and adaptable optical elements should not be adapted to suit the main component of the apparatus, but vice versa, namely to adapt the positioning of the main component to the optical components which are located downline, thereby achieving considerable savings and simplifications both in construction and operation.

In the context of the invention, the term folding mirror should be understood as embracing not only mirrors which, in pairs, effect a reversal of the beam, in each case parallel to themselves, as occurs in the case of folded resonators in a comparatively narrow sense, but should, rather, also embrace any other mirrors which may be installed inside a resonator and which effect a polarizing reversal of the beam.

It can be very expedient if the plane of reflection of the resonator is rotatable, so as to be able to adjust the plane of polarization or, as the case may be, the direction of the major axis of an elliptically polarized beam cross-section, to suit any desired conditions.

Citing an angle of 45° should not be understood as a narrow limitation, and should also include those deviations from this angular value which might, in a particular case, be due, for example, to a deviation of the working direction of the laser beam from the vertical.

In the following text, the invention is explained in more detail, by reference to the drawing, which diagrammatically illustrates an example of the apparatus arrangement according to the invention. In this drawing:

BRIEF DESCRIPTION OF THE DRAWINGS

FIG. 1 shows a perspective overall view,

FIG. 2 shows a diagrammatic side view of a folded resonator, and

FIG. 3 shows the side view of another type of laser which can be used in conjunction with the invention, and which has a rotatable plane of polarization.

DESCRIPTION OF THE PREFERRED EMBODIMENT

FIG. 1 assumes that the resonator which is used—represented, by way of simplification, as a block—comprises an opaque resonator mirror 2, a transparent resonator mirror 3 and folding mirrors 4. The laser beam, indicated by a dot/dash line, leaves the resonator 1 and enters the device 5 for effecting its circular or elliptical polarization, whence it travels, through the lens system 6, to the workpiece 7.

The plane 8 of reflection of the resonator 1 is inclined at 45° to the vertical direction 9. As a result, on entering the device 5, the plane of polarization of the laser beam is already in the position which, in the prior art, must first be brought about by means of a special arrangement of mirrors.

If, instead of the folded resonator indicated in FIGS. 1 and 2, it is intended to use a linear resonator, it is possible, as shown in FIG. 3, to equip this resonator with a deflecting mirror 4', which can likewise be termed a folding mirror within the sense of the patent claim. This mirror serves to polarize the laser beam in the resonator, and is part of a short end portion 10 of the resonator, this portion 10 being connected to the main portion 11 of the resonator, at 12, via a rotatable connection, in a manner such that it can be rotated about the longitudinal axis of the main portion 11 of the resonator, as indicated by the arrow 13. This arrangement enables the plane of polarization of the beam emerging from the resonator to be adjusted, and hence also allows adjustment of the nature of the polarization of the laser beam.

We claim:

1. A laser apparatus comprising
resonator means for emitting a laser beam, means for circularly polarizing the laser beam emitted from the resonator means, lens means for focusing the laser beam from said circular polarizing means to a workpiece, said laser beam from said circular polarizing means to said lens means having a longitudinal axis, and said resonator means having folding mirror means for linearly polarizing said laser beam, said folding mirror means having a plane of reflection, said resonator means being positioned relative to said circular polarizing means so that the plane of reflection of said mirror means is approximately 45 degrees to said longitudinal axis.

2. The apparatus of claim 1 wherein said resonator means comprises means for selectively rotating said plane of reflection of said mirror means.

3. A laser apparatus comprising resonator means for emitting a laser beam, means for elliptically polarizing the laser beam emitted from the resonator means, lens means for focusing the laser beam from said elliptical polarizing means to a workpiece, said laser beam from said elliptical polarizing means to said lens means having a longitudinal axis, and said resonator means having folding mirror means for linearly polarizing said laser beam, said folding mirror means having a plane of reflection, said resonator means being positioned relative to said elliptical polarizing means so that the plane of reflection of said mirror means is approximately 45 degrees to said longitudinal axis.

4. The apparatus of claim 3 wherein said resonator means comprises means for selectively rotating said plane of reflection of said mirror means.

* * * * *

REEXAMINATION CERTIFICATE (2826th)
United States Patent [19]
Martinen et al.

[11] B1 4,634,831
[45] Certificate Issued Apr. 2, 1996

[54] LASER-MACHINING APPARATUS

[75] Inventors: Hinrich Martinen, Quickborn; Samuel S. Simonsson, Winsen/Bahlburg; Peter Wirth, Winsen/Ludorf, all of Germany

[73] Assignee: Rofin-Sinar Laser, GmbH, Hamburg, Germany

Reexamination Request:
No. 90/003,876, Jun. 12, 1995

Reexamination Certificate for:
Patent No.: 4,634,831
Issued: Jan. 6, 1987
Appl. No.: 575,227
Filed: Jan. 30, 1984

[21] Appl. No.: 575,227

[30] Foreign Application Priority Data

Feb. 15, 1983 [DE] Germany ............... 8304141 U

[51] Int. Cl.⁶ ............... B23K 26/00; H01S 3/10
[52] U.S. Cl. ............... 219/121.74; 219/121.67; 219/121.73; 219/121.75; 372/93; 372/106
[58] Field of Search ........... 219/121.67, 121.73, 219/121.74, 121.75; 372/93, 106

[56] References Cited

U.S. PATENT DOCUMENTS

| | | | |
|---|---|---|---|
| 3,946,233 | 3/1976 | Erben et al. | 250/347 |
| 4,219,786 | 8/1980 | Chester | 372/93 |
| 4,340,969 | 7/1982 | Hamilton et al. | 372/93 |
| 4,380,694 | 4/1983 | Dyson | 219/121.67 |
| 4,420,836 | 12/1983 | Harper | 372/93 |
| 4,547,651 | 10/1985 | Maruyama | 372/106 |

FOREIGN PATENT DOCUMENTS

| | | |
|---|---|---|
| 1914250 | 10/1970 | Germany . |
| 2090047 | 6/1982 | United Kingdom . |

OTHER PUBLICATIONS

Patent Abstract of Japan Publ. No. 57–152389, Sep. 20, 1982, "Method and App. for Laser Working".
Publ. dated Summer 1980 by Two–Six Inc. of Saxenburg, Pa, "0.6 μm Reflective 90° Phase Shifters" (no month).
Publ. dated 1981 by Photon Sources, Inc. of Livonia, MI "letalaserdoitbetter" (no month).
Corresp. to and from Spectra–Physics, Inc. San Jose, CA, from 1982–1985 "the Spectra 810 laser" (no month).

*Primary Examiner*—James Davie

[57] ABSTRACT

A laser apparatus is disclosed comprising a resonator for emitting a laser beam, an assembly for circularly or elliptically polarizing the laser beam emitted from the resonator, a lens assembly for focusing the laser beam from the polarizer to a workpiece with the laser beam from the polarizer to the lens having an axis, and the resonator having a folding mirror assembly for linearly polarizing the laser beam with the resonator being positioned relative to the polarizer so that the plane of reflection of the mirror assembly is approximately 45 degrees relative to the axis.

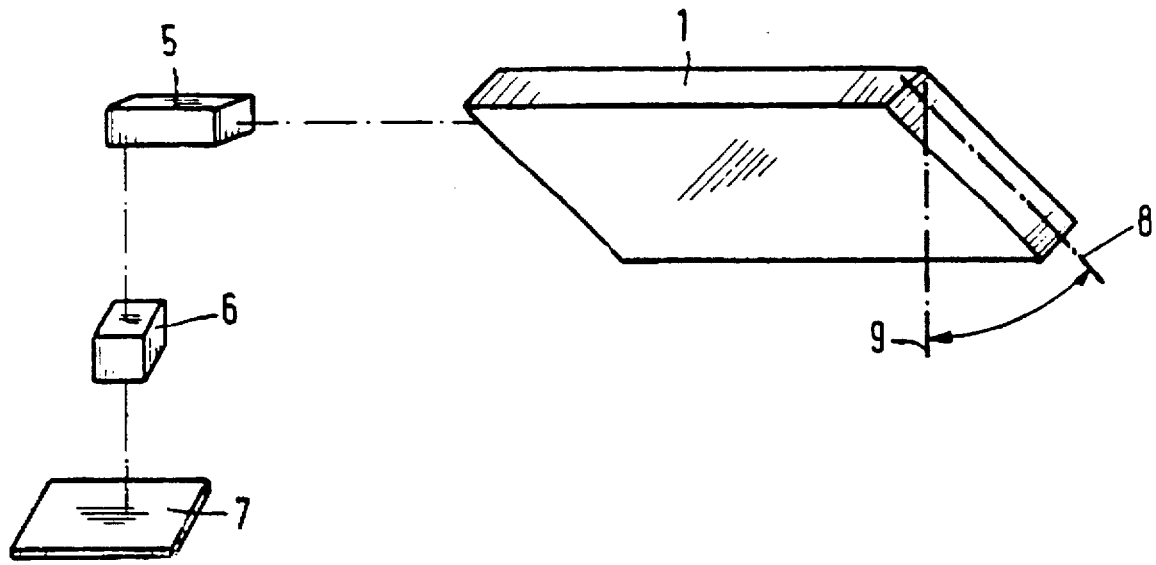

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1–4 are determined to be patentable as amended.

1. A laser apparatus comprising resonator means for emitting a laser beam, means for circularly polarizing the laser beam emitted from the resonator means, lens means for focusing the laser beam from said circular polarizing means to a workpiece, said laser beam from said circular polarizing means to said lens means having a longitudinal axis, and said resonator means having folding mirror means for linearly polarizing said laser beam, said folding mirror means [having a] *defining a single* plane of reflection, said resonator means being [positioned] *inclined* relative to said circular polarizing means so that the *single* plane of reflection [of] *defined by* said mirror means is approximately 45 degrees to said longitudinal axis.

2. The apparatus of claim 1 wherein said resonator means comprises means for selectively rotating said plane of reflection [of] *defined by* said mirror means.

3. A laser apparatus comprising resonator means for emitting a laser beam, means for elliptically polarizing the laser beam emitted from the resonator means, lens means for focusing the laser beam from said elliptical polarizing means to a workpiece, said laser beam from said elliptical polarizing means to said lens means having a longitudinal axis, and said resonator means having folding mirror means for linearly polarizing said laser beam, said folding mirror means [having a] *defining a single* plane of reflection, said resonator means being [positioned] *inclined* relative to said elliptical polarizing means so that the *single* plane of reflection [of] *defined by* said mirror means is approximately 45 degrees to said longitudinal axis.

4. The apparatus of claim 3 wherein said resonator means comprises means for selectively rotating said plane of reflection [of] *defined by* said mirror means.

* * * * *